Nov. 20, 1923.

D. A. WHITSON

METHOD OF PRODUCING SOUND RECORDS

Original Filed Feb. 10, 1920

1,474,695

Inventor
Delmar A. Whitson
By Graham + Harris
Attorneys

Patented Nov. 20, 1923.

1,474,695

UNITED STATES PATENT OFFICE.

DELMAR A. WHITSON, OF LOS ANGELES, CALIFORNIA.

METHOD OF PRODUCING SOUND RECORDS.

Application filed February 10, 1920, Serial No. 357,679. Renewed April 30, 1923.

*To all whom it may concern:*

Be it known that I, DELMAR A. WHITSON, a citizen of the United States, residing in Los Angeles, in the county of Los Angeles and State of California, have invented a new and useful Improvement Comprising the Methods of Producing Sound Records, of which the following is a specification.

The principal object of my invention is to provide a sound record which will be free from the imperfections usually found in such records, especially the uncontrolled element due to inertia of parts in effecting sound records.

Further objects and advantages will be made evident hereinafter.

Figure 1:
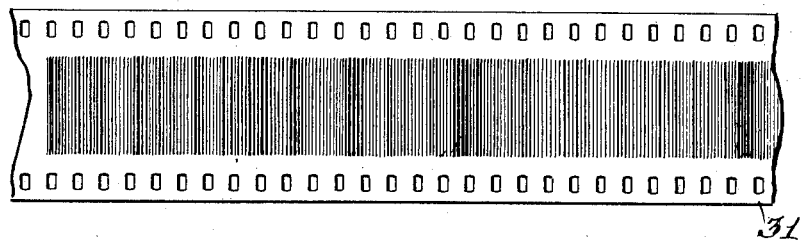

Referring to the drawing which is for illustrative purposes only, Fig. 1 is a view of a film containing the sound record.

Figure 2:
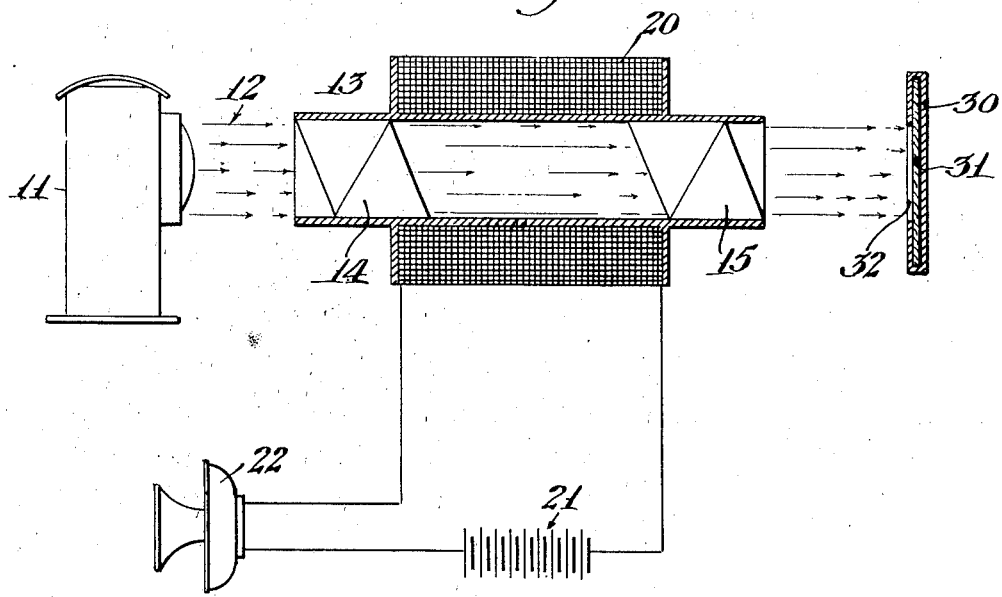
Figure 3:
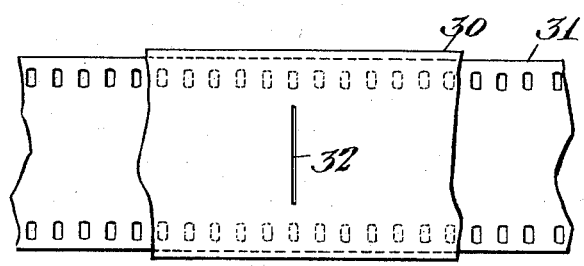

Fig. 2 is a diagrammatic view of the apparatus used to produce this record.

The apparatus consists of a luminous source 11 which is equipped to throw a beam of light 12 into a tube 13. Located in this tube are two Nicol prisms 14 and 15, one at either end of the tube, the space 16 between the prisms being filled with a substance of high magneto rotary index, such as mercuric potassium iodide or carbon bisulphide. Surrounding the tube 13 is a coil 20 of insulated wire which is energized from a battery 21 controlled by a microphone 22.

Located beyond the prism 15 is a closed channel 30 thru which a film 31 is passed, the closed channel 30 having a narrow slot or opening 32 in the front thereof upon which the beam of light from the prism 15 impinges.

The method of operation is as follows;

The beam of light 12 striking the prism 14 is polarized in a certain plane, this polarized light passing thru the mercuric potassium iodide or carbon bi-sulphide and striking the second prism 15 whose axis is at an angle of 45 degrees with the prism 14.

Unless rotated as hereinafter will be explained, the beam of light from the prism 14 being polarized in a different plane from the prism 15 is entirely interrupted thereby no light passing beyond to act upon the film 31.

Upon energizing the coil 29, however, the beam of light leaving the prism 14 has its plane rotated to a greater or lesser degree depending upon the excitation of the coil 20. As a consequence some or all of this light may be passed thru the prism 15, the amount of light which passes being dependent upon the magnetic intensity in the coil 20 which in turn is dependent upon the excitation of this coil which is controlled by the microphone 22. The result is that the film 31 is exposed in a series of bands of varying intensity. The film after being exposed is developed and fixed in the standard manner resulting in a sound record which may be used in a suitable re-producing device which forms no part of this invention, for the purpose of reproducing the sounds originally recorded.

I claim as my invention:

1. An apparatus for recording sound comprising a luminous source; a primary polarizer for polarizing in a certain plane a beam of light from said source; a secondary polarizer set to interrupt a portion of said polarized light; sound controlled means for rotating the plane of polarization of said light between said polarizers; and means for recording the intensity of the light passing the secondary polarizer.

2. An apparatus for recording sound comprising a luminous source; a primary polarizer for polarizing in a certain plane a beam of light from said source; a secondary polarizer set to interrupt a portion of said polarized light; sound controlled means for magnetically rotating the plane of polarization of said light between said polarizers; and means for recording the intensity of the light passing the secondary polarizer.

3. An apparatus for recording sound comprising a luminous source; a primary polarizer for polarizing in a certain plane a beam of light from said source; a secondary polarizer set to interrupt a portion of said polarized light; sound controlled means for rotating the plane of polarization of said light between said polarizers; and means for photographically recording the intensity of the light passing the secondary polarizer.

4. An apparatus for recording sound comprising a luminous source; a primary polarizer for polarizing in a certain plane a beam of light from said source; a secondary polarizer set to interrupt a portion of said polarized light; sound controlled means for magnetically rotating the plane of polarization of said light between said polarizers; and means for photographically recording the intensity of the light passing the secondary polarizer.

In testimony whereof, I have hereunto set my hand at Los Angeles, California, this 2nd day of February, 1920.

DELMAR A. WHITSON.